US007284513B2

(12) United States Patent
Enchev

(10) Patent No.: US 7,284,513 B2
(45) Date of Patent: Oct. 23, 2007

(54) INTERNAL COMBUSTION ENGINE WITHOUT CONNECTING ROD AND A METHOD OF ITS CONSTRUCTION

(75) Inventor: Encho Mihaylov Enchev, Stara Zagora (BG)

(73) Assignee: Encho Mihaylov Enchev and Michaela Encheva Encheva, Stara Zagora (BG)

(*) Notice: Subject to any disclaimer, the term of this patent is extended or adjusted under 35 U.S.C. 154(b) by 25 days.

(21) Appl. No.: 10/573,371

(22) PCT Filed: Sep. 23, 2004

(86) PCT No.: PCT/BG2004/000019

§ 371 (c)(1),
(2), (4) Date: Mar. 24, 2006

(87) PCT Pub. No.: WO2005/031118

PCT Pub. Date: Apr. 7, 2005

(65) Prior Publication Data

US 2007/0034176 A1 Feb. 15, 2007

(30) Foreign Application Priority Data

Sep. 25, 2003 (BG) ..................................... 108200

(51) Int. Cl.
*F02B 75/22* (2006.01)
*F16H 25/08* (2006.01)

(52) U.S. Cl. ......................... 123/54.1; 123/54.3; 74/55

(58) Field of Classification Search ............... 123/54.1, 123/54.2, 54.3, 54.4, 55.3, 43 AA, 197.1; 74/55
See application file for complete search history.

(56) References Cited

U.S. PATENT DOCUMENTS

| | | | | |
|---|---|---|---|---|
| 793,270 | A | 6/1905 | Lomgren | |
| 1,817,375 | A | 8/1931 | Imblum | |
| 2,477,061 | A | 7/1949 | Orville | |
| 6,691,648 | B2 * | 2/2004 | Beierle | 123/54.3 |
| 7,121,252 | B2 * | 10/2006 | Johnson | 123/197.1 |

FOREIGN PATENT DOCUMENTS

| | | | |
|---|---|---|---|
| DE | 30 32 745 | A | 4/1982 |
| GB | 1 194 067 | A | 6/1970 |

* cited by examiner

*Primary Examiner*—Stephen K. Cronin
*Assistant Examiner*—Hyder Ali
(74) *Attorney, Agent, or Firm*—Knobbe, Martens, Olson & Bear LLP

(57) ABSTRACT

The invention relates to the structure of internal combustion engine without a connecting rod and a method of its construction. The proposed method of construction describes the consecutive steps in creating the engine and allows the creation of internal combustion engine without a connecting rod with six and more even number of arc-like units (6) whereat the heating of the opposite arc-like units (6) in the center O.sub.1 of the engine is removed. The complex mounting and dismounting of the engine shaft is eliminated too, because according to the invention the engine shaft is not articulated of several details, but it is whole, uncut. Besides, the possibility is obtained for a change of the revolutions of the engine shaft (11) without reductor in one and the same stroke frequency of the pistons (3) movement by changing only the number of working cylinders of the engine.

3 Claims, 3 Drawing Sheets

INTERNAL COMBUSTION ENGINE WITHOUT CONNECTING ROD AND A METHOD OF ITS CONSTRUCTION

TECHNICAL FIELD

The invention relates to the structure of internal combustion engine without a connecting rod and a method of its construction designed for operation of transport vehicles as well as power aggregates set in motion and situated in industry and agriculture.

BACKGROUND OF THE INVENTION

Star-like aircraft internal combustion engines including circular case with mounted on it nine radial arranged cylinders and pistons lying in the same plane are already well-known. (For example:"Star-like aircraft engine cross section named Lajkoming" Eng. Julius Mezkerle, "Vehicle engines with air cooling" page 220, Moscow 1959; translation from Czech into Russian; Nine cylinder aircraft engine "AIII-62 иP" Petr S. Labasin, "Aircraft engine AIII-62 иP", page 22, Moscow, 1972, including circular case with mounted on it and lying in one plane up to nine radial situated cylinders with pistons. The pistons are connected flexibly by piston bolts and by connecting rods with joined crankshaft. The crankshaft is put in the form of a bearing in the case center and it forms together with the connecting rods a joined crank mechanism.

A disadvantage of those engines is the kinematics of the crank mechanism where the reciprocating motion of the pistons is transformed into rotary motion of the crankshaft. Notwithstanding of the number of the radial arranged cylinders, each of the pistons performs two runnings only—from one end dead center to another such dead center and back—per one revolution of the crankshaft.

For example, if the four strokes cycle of the engine work is ensured, the crankshaft performs two revolutions. It reduces the power given away by one unit weight of the engine and it is necessary to rev the crankshaft revolutions in order to increase that power. The crankshaft revolutions revved increase the inertia forces and burden additionally the crank mechanism elements.

A disadvantage of the crank transforming mechanism is the presence of side friction force of the pistons on the walls of the cylinders which leads to losses due to the friction and higher wear and tear of those elements.

Another disadvantage of the crank transforming mechanism is the presence of a flexible hinged link in the piston which link is formed by itself, by the piston bolt, and by the head of the connecting rod. It increases the length of the guiding part of the pistons, of the total working length of the cylinders and thus it leads to the increase of the overall dimensions and of the engine weight.

A cross-like four pistons internal combustion engine without a connecting rod is also well-known. (Bulgarian authorship certificate No. 42948, published in bulletin No. 3/15.03.1988). The engine has been constructed on the basis of a regular hinged four-units which is deformed at work consequently into a rhomb at the two mutually perpendicular axes of the co-ordinates. The hinged four-units works on two rollers of the outgoing shaft and sets it in a rotary motion.

A disadvantage of that engine is as follows: the kinematics of the mechanism for transformation of the reciprocal motion of the pistons into a rotary motion of the outgoing shaft allows the construction of engines limited with four cross-like arranged cylinders only. That kinematics prohibition does not allow the use of the principle of fragmentation of the working engine volume into six, eight, twelve and more cylinders with smaller single volume in order to reduce the weight of the flexible elements and their inertia forces, to increase the revolutions, and to increase the specific power per unit working volume.

Another disadvantage of that engine is the inconsistency that crops up while making clear its kinematics. According to the description, the author's claims and the figure attached to them, the divisor diameter of the inner teeth (8) of the engine case (7) is equal to the doubled divisor diameter of the teeth segments (2), while the axis of the hinged links between the segments (2) and the piston rods (3) coincide with the divisor diameter of the tooth gearing.

It means that both rollers (9) which tumble on the inner arc-like side of the teeth segments (2), when they stand right on the axis line of the two opposite cylinders (6), they will have shoved out their two adjacent hinges (and their respective pistons) at the upper dead center, and the other two opposite hinges must coincide simultaneously in the center of the mechanism,and therefore they will hit each other. On the enclosed figure of the authorship certificate the two hinges are at the upper dead center, and the other two opposite ones do not reach the mechanism center, i.e. they are not at the lower dead center—and it is obligatory. That inconsistency has not been clarified anywhere in the description.

Another disadvantage of that engine is disclosed in the author's claim 2 which is not applicable because according to it "The axis of the hinged links between the teeth segments (2) and the piston rods (3) coincide with the divisor diameter of the teeth gearing", and it is well-known from the theory of the cylindrical teeth drives that such a common "divisor diameter of teeth gearing does not exist"—there is always a tooth drive between two teeth elements, each one of them having its own divisor diameter. The more so as, "the axis of the hinged links between the teeth segments (2) and the piston rods (3) coincides with the divisor diameter of the gearing" only at the moment of motion of the units when two of those axes are at the upper dead center. Only then those axes coincide at the same time with the divisor circumference of the engine case and of the divisor circumferences of the segments, but even at that moment almost the whole segments and the other two axes are far away from such coincidence.

A disadvantage of the engine from authorship certificate No. 42948 appears the engine shaft which is complicated enough for the purpose of mounting and dismounting.—"The engine shaft lies on the axis of the engine case (7), and it is joined with two discs with shafts at their outer side, while the shafts have been put in the form of a bearing in the lids of the engine case (7), and the two axes (1) have been fixed between the discs; those axes are situated symmetrically to the axis of the engine shaft. Two rollers (3) are put in the form of a bearing on the axes; the outer radius of the rollers is equal to the inner radius of the teeth segments (2)".

Therefore, the teeth segments (2) lie between the two discs of the build-up shaft, and the same one cannot be mounted or dismounted separately as a shaft set, and those operations have to be made by means of technological manipulations with the whole engine which makes the mounting and dismounting work complex.

A general disadvantage of the internal combustion engines working with crankshaft transforming mechanism as well as of the engine without a connecting rod according to the authorship certificate No. 42948 is the fixed kinematics dependence between the revolutions of the outgoing engine shaft and the stroke frequency of their pistons. It is two strokes of the pistons per one revolution of the crankshaft in the crankshaft transforming mechanism, regardless of the cylinders number in the engine, and four piston strokes per one revolution of the engine shaft in the cross-like four cylinders engine without a connecting rod according to the authorship certificate above. It is impossible by programming a big number of piston strokes per time unit in advance to create an engine with lower revolutions of the outgoing engine shaft, which depending on the number of the cylinders with corresponding increase of the rotary moment not to use additional reduction gear. Such a possibility is particularly useful in engines for setting in motion of transport vehicles.

Thus, the object of the invention is to create a method of construction, and to design the structure of an internal combustion engine without a connecting rod with six and more even number of the arc-like units, whereat the number of the strokes of the pistons in the working cylinders from one end position to another end position must be greater than four per one revolution of the outgoing engine shaft, and the number of their strokes must depend on the number of the arc-like units; and at their increase to reduce the kinematically the revolutions of the outgoing engine shaft in order to increase the outgoing rotary moment of the shaft, without using additional reduction gear; and to ensure kinematically that the opposite hinged links of the arc-like units at their inner end position do not reach the mechanism center in order to prevent their hitting and ensure the mounting and dismounting of the engine shaft, together with the mounted on it driving rollers, with their axes, without disturbing the mounting of the arc-like units and their hinged links with the pistons.

Further object of the invention of the internal combustion engine without a connecting rod with six and more even number of arc-like units is the elimination of the piston side force on the working cylinders.

SUMMARY OF THE INVENTION

According to the invention those objects are solved by a method of construction and structure of internal combustion engine without a connecting rod. That method concerns the construction of an engine without a connecting rod with six and more even number of arc-like units, whereat the number of arc-like units and the stroke of the pistons S are programmed in advance, whereat the number of the working cylinders and their corresponding pistons is an even number too, equal to or smaller than the number of the arc-like units. The center of the engine is marked as $O_1$ and depending on the chosen even number of the arc-like units there are drawn the same number of radial beams f through the center which form equal central angles $\alpha$ among them. The radial beams are axis lines of the working cylinders. The basic circumference $K_1$ with its radius $R_1$ is drawn depending on the even number chosen of the arc-like units and the programmed stroke S of the pistons in the working cylinders, which are connected among them by the relation $$R_1 = \frac{S}{1 - \cos\alpha},$$

where the beams cross the basic circumference and cut it into arcs equally long. There are drawn additional circumferences $K_2$ so that their centers lie on the radial beams, which are odd in number. The number of the circumferences $K_2$ is equal to the half of the number chosen of the arc-like units and the radii of the circumferences $K_2$ are always equal to half of the basic circumference $K_1$ radius. The circumferences $K_2$ pass at the same time through the basic circumference $K_1$ center as well as through the basic circumference $K_1$ crossing points with the odd number of radial beams and because the number of circumferences $K_2$ is half of the number of the arc-like units, thus the common points of the circumferences $K_1$ and $K_2$ are half of that number too, and those points connected consecutively form the basic chords of the basic circumference $K_1$, whereat the distance between the common points of the mutually crossing circumferences $K_2$ which are at the same time points of the crossing lines in the middle of the basic chords with the even number of radial beams on one part and on the other—the crossing points of the same even number of radial beams with the basic circumference $K_1$ define the value of the stroke S of the pistons. The chain-like connected basic chords form a close geometrical figure drawn in the basic circumference $K_1$. The tops of that figure divide the basic circumference $K_1$ into arcs equally long and each of those arcs is as long as two arcs of the same circumference $K_1$ divided by the radial beams; or to each half length of the basic chords belongs one arc of the division of the circumference $K_1$ by the radial beams, but the halves of the basic chords taken separately are chords of the circumferences $K_2$ with their adjacent arcs of those circumferences $K_2$. Thus, there is equation between the lengths of the arcs of the circumferences $K_1$ and $K_2$. That arc equation of both kinds of circumferences permits reciprocating roll over without slipping over from one end position to another end position of the arcs of the circumferences $K_2$ on the arcs of the circumference $K_1$. The ends of the arcs of the circumferences $K_2$ slip rectilinear, reciprocating on each of the axis lines of the cylinders on which those ends lie without leaving them or deviating from them, moving from the crossing points of the radial beams with the circumference $K_1$ to the common crossing points between the circumferences $K_2$ which on its part represents the stroke of the pistons. The consecutive chain-like connection of the ends of the arcs of the circumferences $K_2$ form a close geometrical figure with arc-like units, whereat the mutually connected ends of the units are formed by means of axes as cylindrical hinges of that hinged multi-unit, whereat the arcs of the circumferences $K_2$ form the outer cylindrical surfaces of the arc-like units and the basic circumference $K_1$ forms the inner cylindrical surface of the engine case on which the arc-like units of the hinged multi-unit roll over reciprocating. The rods of the pistons are connected flexibly in the axes of the deforming hinged multi-unit and with their other ends the piston rods are fixed with the pistons. There are drawn circumferences $K_3$ from the centers of the circumferences $K_2$ with radii smaller than the radii of the circumferences $K_2$; the circumferences $K_3$ define the inner cylindrical surfaces of the arc-like units on which surfaces the engine rollers roll over, mounted by means of their axes on the gear wheels of the engine shaft.

The internal combustion engine without a connecting rod with six and more arc-like units is created by the method of construction of such an engine, which includes an engine case with working cylinders and pistons in them radially situated and lying in one plane which are fixed on the engine case. The number of the cylinders and the pistons of the engine are equal or smaller than the number of arc-like units and it is even in number. The pistons are fixed with the piston rods, and the piston rods at their other ends are connected flexibly by means of crank axes in hinges with the arc-like units, as the even number of the arc-like units is equal or greater than six and those units form a closed hinged multi-unit, which touches flexibly with its outer cylindrical surfaces of the arc-like units on the inner cylindrical surface of the engine case. The engine shaft is situated in the axis of the engine case. It is formed by the shaft itself with two gear wheels with rounded and pierced teeth as the engine shaft is put as a bearing on both sides of the lids of the engine case. The axes with the engine rollers put in the form of a bearing, with axes parallel to and stand at equal distance of the axis line of the engine shaft are mounted between the two gear wheels in their pierced teeth. The outer diameter of the rollers is equal to the inner diameter of the arc-like units and the number of those rollers their axes and the number of the teeth of each gear wheel are the half of the number of the arc-like units of the engine.

The articulation of two adjacent arc-like units in the hinged multi-units forms working crank arms $n_1$ and the number of crank arms $n_1$ is equal to the number of the arc-like units.

An internal combustion engine without a connecting rod with six and more even number of arc-like units is created using a tooth power synchronizer, formed by the inner cylindrical surface of the engine case with cut on it inner teeth. The basic circumference $K_1$ is a divisor circumference of those teeth and geared in them outer teeth of the arc-like units with dividing circumferences $K_2$. The axes of the hinged links between the arc-like units and the piston rods lie on the divisor circumferences of the arc-like units of the hinged multi-units. The diameters of the dividing circumferences of those units are equal to the half of the divisor diameter of the engine case, regardless of the even number of the arc-like units of the engine.

The advantage of the invention is that a method of construction and structure of the internal combustion engine without a connecting rod are created where the number of the strokes of the pistons from one end position to another end position is greater than four per one stroke of the outgoing engine shaft and their number of the strokes depends on-the even number of arc-like units, whereat by their increase the revolutions of the outgoing engine shaft kinematics decrease and the outgoing revolution moment of the shaft is increased without the use of additional reduction gear. It is kinematically ensured that at teir inner end position the opposite hinge links of the arc-like units do not reach the engine center, by means of which the possibility of their hitting each other is eliminated and mounting and dismounting of the engine shaft together with the rollers with their axes mounted on the engine shaft, is provided for without disturbing.

Another advantage of the invention is the creation of a method of construction and structure of internal combustion engine without a connecting rod with six and more even number of arc-like units using tooth force synchronizer, formed by the inner cylindrical surface of the engine case with carved inner teeth on it with the dividing circumference $K_1$ and outer teeth of the arc-like units geared in them with the dividing circumferences $K_2$, whereat the axes of the hinged links between the arc-like units and the piston rods lie on the dividing circumferences of the arc-like units of hinged multi-units, and the diameters of the dividing circumferences of the arc-like units are equal to the half of the divisor diameter of the engine case, regardless of the even number of the arc-like units of the engine.

BRIEF DESCRIPTION OF THE DRAWINGS

An example embodiment of the invention is shown on FIGS. 1, 2 and 3, where the figures show.

DETAILED DESCRIPTION OF THE INVENTION

Figure 1:
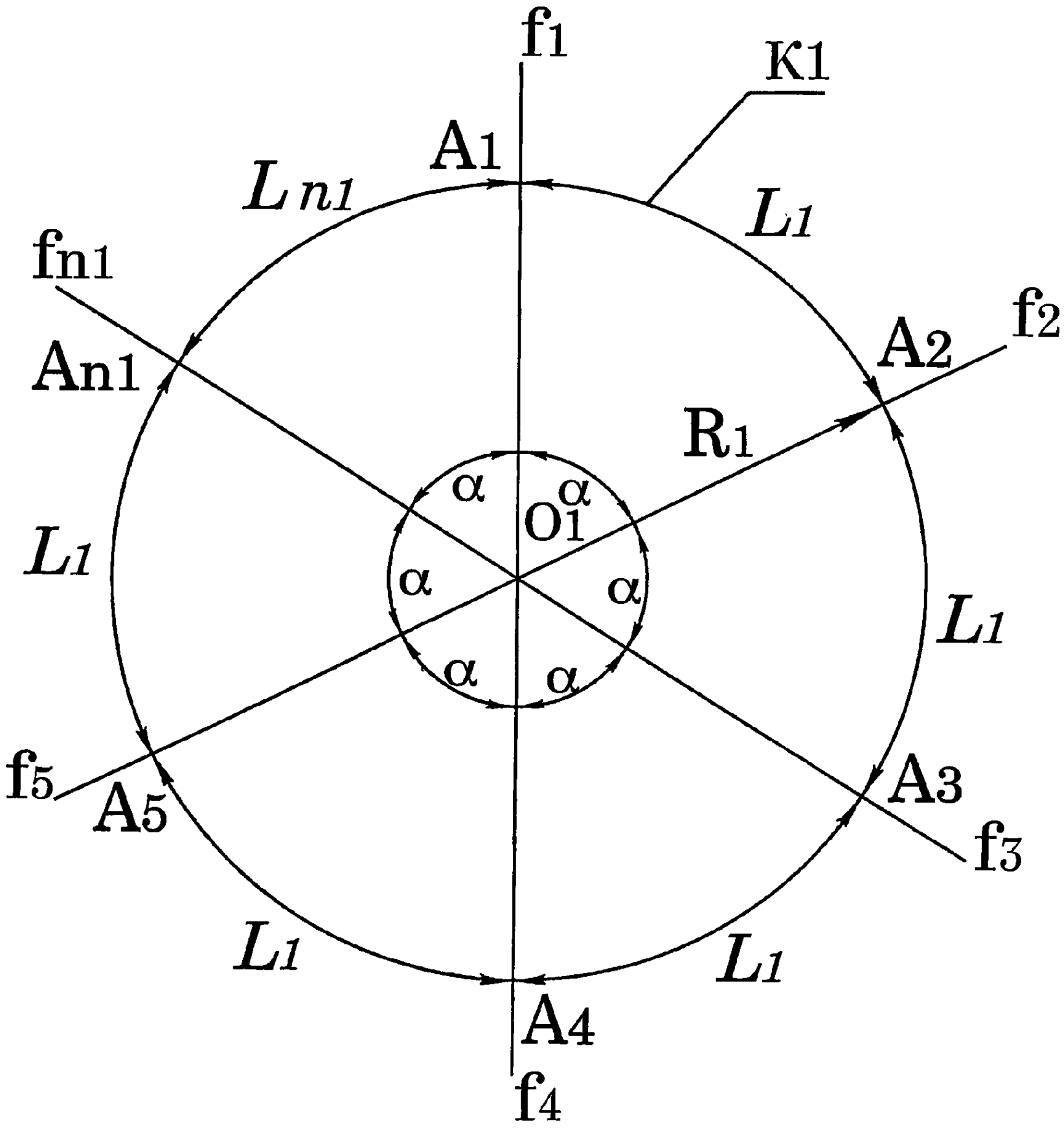
FIG. 1 shows the division of the basic circumference.

The method of construction of internal combustion engine without a connecting rod with six and more even number of arc-like units defines the consecutive steps of the engine construction, while at beginning the number of the working crank arms $n_1$ and the stroke of the pistons S in the cylinders is programmed whereat the number of the working crank arms $n_1$ is an even number, equal to or greater than six. The center $O_1$ of the engine without a connecting rod is marked and depending on the even number chosen of the crank arms $n_1$ there are drawn through the center the same number of radial beams $f_1 \ldots fn_1$ (FIG. 1), which form equal central angles $\alpha$ among them and which are the axes lines of the working cylinders. There is drawn the basic circumference $K_1$ with a radius $R_1$ from the center $O_1$ depending on the even number chosen of crank arms $n_1$ and the stroke S of the pistons according to the relation between them $$R_1 = \frac{S}{1 - \cos\alpha}$$

while the beams $f_1 \ldots fn_1$ cross the basic circumference $K_1$ at the points of $A_1 \ldots An_1$ and divide it into $n_1$ numbers of arcs $\overset{\frown}{L_1}$, equally long.

The additional circumferences $K_2$ (FIG. 2) are drawn whereat their centers $O_2$ lie on the odd radial beams $f_1$; $f_3$; $f_5$, whereat the number of the circumferences $K_2$ is equal to half of the number chosen of the working crankarms $n_1$ and the radii $R_2$ of the circumferences $K_2$ are equal to half of the radius $R_1$ of the basic circumference $K_1$.

All circumferences $K_2$ pass simultaneously through the center $O_1$ of the basic circumference $K_1$ and through the crossing points $A_1$; $A_3$; $A_5$ of the basic circumference $K_1$ with odd radial beams $f_1$; $f_3$; $f_5$. Since the circumferences $K_2$ are $n_1/2$ in number, thus the common points of the circumferences $K_1$ and $K_2$ are $n_1/2$ in number.

The basic chords $A_1A_3$; $A_3A_5$; $A_5A_1$ are drawn on the circumference $K_1$ by means of consecutive connection of the common points of the circumferences $K_1$ and $K_2$ (FIG. 2), whereat the distances from the crossing points $B_1$; $B_2$; $B_3$ of the basic chords $A_1A_3$; $A_3A_5$; $A_5A_1$ with their perpendicular axes lines $f_2$; $f_4$; $f_6$ on one part and from the crossing points $A_2$; $A_4$; $A_6$ of the same axes lines with the basic circumference $K_1$ on the other part, define the stroke S of the pistons.

The chain-like connected basic chords $A_1A_3$; $A_3A_5$; $A_5A_1$ form a close geometrical figure inscribed in the circumference $K_1$. The tops of that figure $A_1$; $A_3$; $A_5$ divide the basic circumference $K_1$ into arcs $n_1/2$ in number with equal length $\overset{\frown}{A_1A_2A_3}$; $\overset{\frown}{A_3A_4A_5}$; $\overset{\frown}{A_5A_6A_1}$; thus, to each half length of the chords $A_1A_3$; $A_3A_5$; $A_5A_1$ there corresponds one arc $\overset{\frown}{L_1}$.

However, the halves of the basic chords $A_1B_1$; $B_1A_3$; $A_3B_2$; $B_2A_5$; $A_5B_3$; $B_3A_1$ taken separately are chords of the circumferences $K_2$ with their corresponding adjacent arcs $\overset{\frown}{L_2}$ and the length of the arcs $\overset{\frown}{L_2}$ from the circumferences $K_2$ is equal to the length of the arcs $\overset{\frown}{L_1}$ from the circumference $K_1$.

Figure 2:
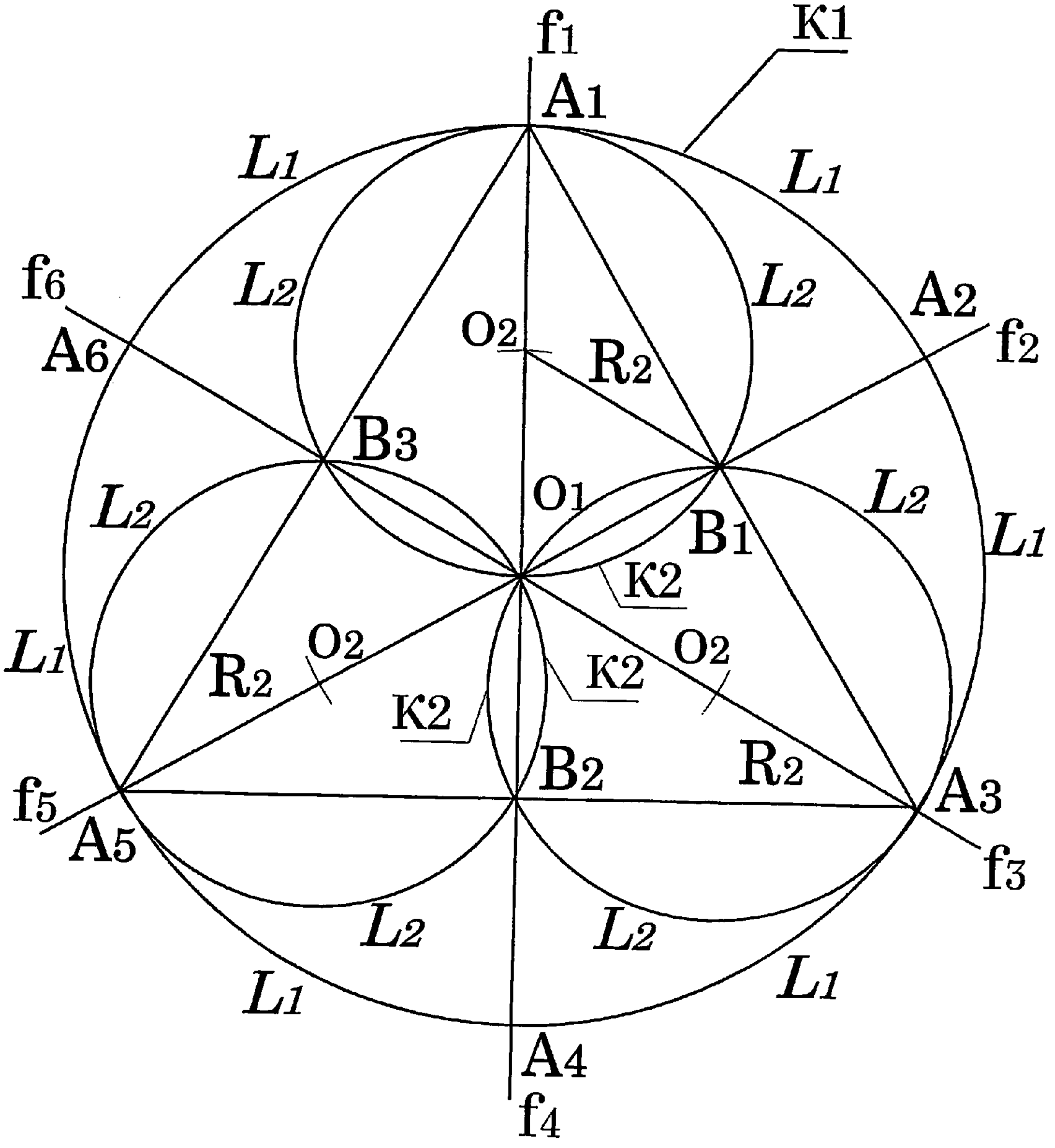
FIG. 2 shows the determination of geometry of the arc-like units.
Figure 3:
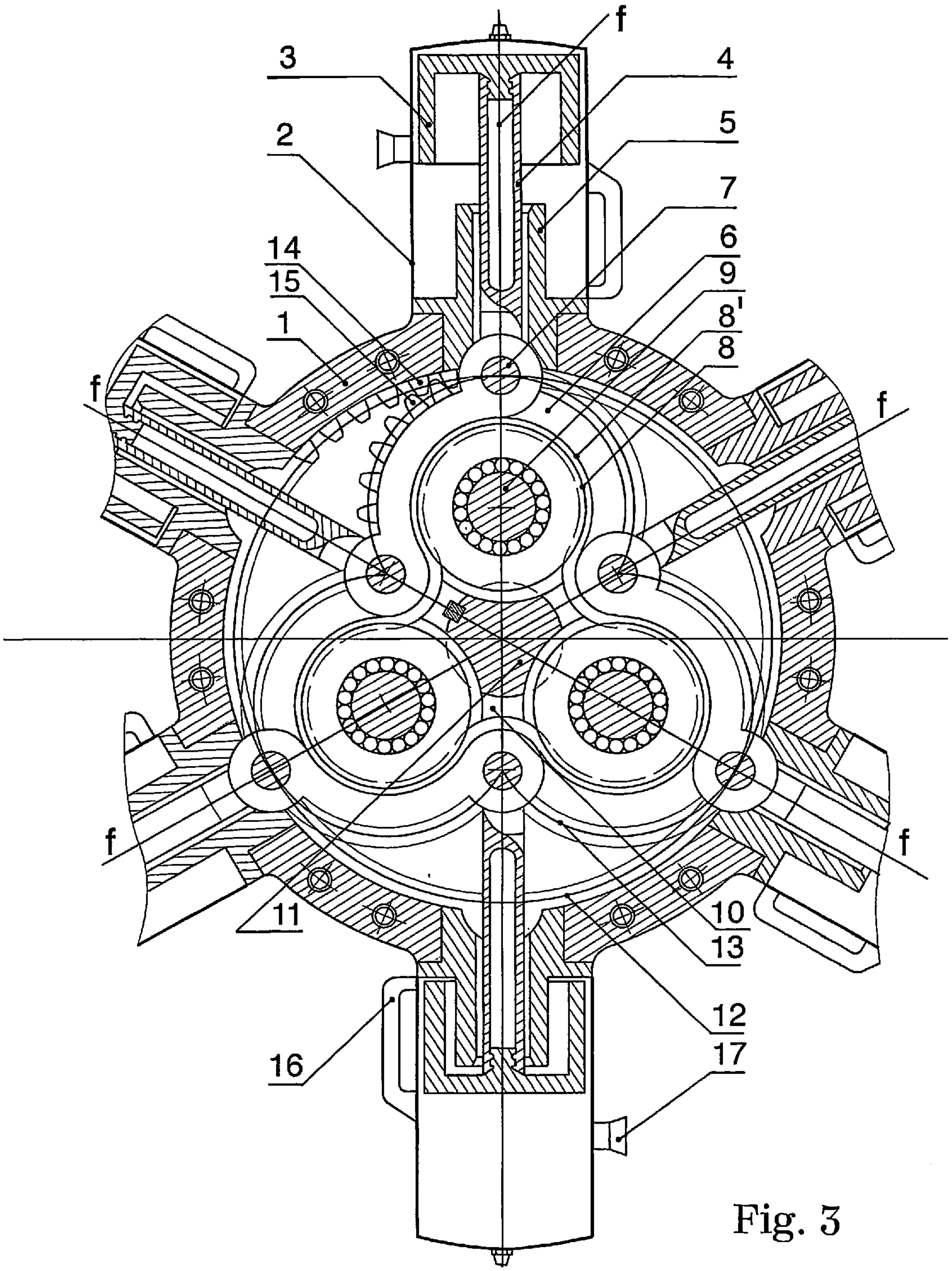
FIG. 3 represents a cross section of the internal combustion engine without a connecting rod.

The consecutive chain connection of the arcs $\overset{\frown}{L_2}$ ($\overset{\frown}{A_1B_1}$; $\overset{\frown}{B_1A_3}$; $\overset{\frown}{A_3B_2}$; $\overset{\frown}{B_2A_5}$; $\overset{\frown}{A_5B_3}$; $\overset{\frown}{B_3A_1}$) form a close geometrical figure with arc-like units (FIG. 2). The mutually connected ends of the arcs are modeled as cylindrical hinges 7 of the crank arms $n_1$ (FIG. 3) of that hinged multi-units, as the arcs $\overset{\frown}{L_2}$ from the circumference $K_2$ (FIG. 2) form the outer cylindrical surfaces of the arc-like units 6 (FIG. 3). The basic circumference $K_1$ (FIG. 2) forms the inner cylindrical surface of the engine case 1 (FIG. 3), on which the arc-like units 6 of the hinged multi-units roll over reciprocatingly. The piston rods 4 are connected flexibly in the axes of the deforming hinged multi-units and with its other ends the piston rods 4 are fixed with the pistons 3. There are drawn circumferences $K_3$ (8') from the centers $O_2$ of the circumferences $K_2$ with radii $R_3<R_2$, where the circumferences $K_3$ (8') define the inner cylindrical surfaces of the arc-like units 6 on the surfaces of which the engine rollers 8 of the engine shaft 11 roll over.

An example embodiment of the invention as a structure is shown on FIG. 3, which shows a cross section of an internal combustion engine without a connecting rod with six and more arc-like units, constructed by the disclosed method of construction of such an engine, which includes an engine case 1 with fixed on it and radially situated in one plane with it working cylinders 2 and pistons 3. The pistons 3 are fixed with the piston rods 4, and the piston rods 4 at their other ends are connected flexibly through cylindrical hinges 7 of the working crank arms $n_1$ with the arc-like units 6 as the even number of arc-like units 6 define the number of the working cylinders 2 with the pistons 3 and those arc-like units 6 are connected in a closed hinged multi-unit, that touches flexibly with its outer cylindrical surfaces the inner cylindrical surface of the engine case 1.

The engine shaft 11 is situated in the axis of the engine case 1. It is formed by the shaft 11 and two gear wheels 10 with rounded and pierced teeth as the engine shaft 11 is put as a bearing on both sides of the lids of the engine case 1. The axes 9 with the engine rollers 8 put in the form of a bearing, with a radius equal to the radius $R_3$ of the inner cylindrical surfaces of the units 6 are mounted between the two gear wheels 10 in their pierced teeth. The axes 9 of the engine rollers 8 are parallel to and stand at equal distance of the axis line of engine shaft 11 and the number of those rollers 8 and the corresponding number of the teeth of each gear wheel 10 is the half of the number of the arc-like units 6 of the engine.

The tooth power synchronizer of the movement (FIG. 3) is formed by the inner cylindrical surface of the engine case 1 with cut on it inner teeth 14 with the dividing line the basic circumference $K_2$ 12 and geared in them outer teeth 15 of the arc-like units 6 with the dividing lines the circumferences K2 13, whereat the axes of the cylindrical hinges 7 among the arc-like units 6 and the piston rods 4 lie on those dividing circumferences $K_2$ 13.

The way of working of the internal combustion engine without a connecting rod according to FIG. 3 is as follows:

The gas forces of the expanding gas mixture burnt act on the heads of the pistons 3 that are at the top dead center. The forces are transmitted by means of the piston rods 4 to the axes of the cylindrical hinges 7, which connect the piston rods 4 with the adjacent couples of the arc-like units 6.The latter are geared with their teeth 15 in the teeth 14 of the engine case 1 and transmit the reaction of the gas forces to the engine case 1. With their inner surfaces they transmit that reaction to the engine rollers 8 as they support them by means of one-sided pressure on their axes 9. The axes 9 are mounted in the teeth of the gear wheels 10 of the engine shaft 11, and they force it to turn round its axis. Since the length of the dividing line of the teeth arc-like units 6 between each two axes of the cylindrical hinges 7 is always equal to the length of the arc 12 from the dividing circumference $K_1$ (FIG. 3) of the engine case 1 between each two axis lines f of the adjacent cylinders 2, it allows reciprocating roll over without slip over from one end position of the arc-like units 6 to another end position. Then the ends of the arc-like units 6, which are in the axes of the cylindrical hinges 7 slip rectilinear, reciprocating together with the piston rods 4 and the pistons 3 in the working cylinders 2, and the engine shaft 11 turns in one direction as per one stroke of the pistons 4 it turns round at $360/n_1°$. The suction of the burning mixture is performed in the space under the pistons, closed by the bush 5 and the the burning mixture is blasted in the space above the pistons through the passage 16. The gases burnt are blown off through a second passage 17, whereat both passages are opened consecutively by the pistons.

The lubrication of the flexible parts of the engine case 1 of the engine is done by splashing of oil on its engine case.

The engine with the mechanism described above substituting the crankshaft mechanism, may be applied in all types of engines and power machines.

The invention claimed is:

1. Method of construction of internal combustion engine without a connecting rod characterized in that that the number of working crank arms ($n_1$) and the stroke of the pistons (S) in the cylinders are programmed in advance, whereat the number of the crank arms ($n_1$) is an even number, equal to or greater than six, the center ($O_1$) of the engine is marked and depending on the even number chosen of the crank arms ($n_1$) there are drawn such a number of radial beams ($f_1 \ldots f_{n1}$) through the center ($O_1$) which form equal central angles ($\alpha$) among them whereat the radial beams are axis lines of the working cylinders; the basic circumference $K_1$ with a center ($O_1$) and a radius $R_1$ is drawn depending on the chosen even number of the crank arms ($n_1$) and the programmed stroke (S) of the pistons, which are connected by the relation $$R_1 = \frac{S}{1 - \cos\alpha},$$

where the beams cross the basic circumference ($K_1$) in the points ($A_1 \ldots A_{n1}$) and cut it into ($n_1$) number of arcs ($\overset{\frown}{L_1}$) equally long; there are drawn additional circumferences ($K_2$) and their centers ($O_2$) lie on the radial beams ($f_1$,$f_3$,$f_5$) odd in number whereat the number of the circumferences $K_2$ is equal to the half of the number chosen of the crank arms ($n_1$) and the radii ($R_2$) of the circumferences ($K_2$) are always equal to half of the basic circumference ($K_1$) radius ($R_1$) and the circumferences ($K_2$) pass at the same time through the basic circumference ($K_1$) center ($O_1$) as well as through the basic circumference ($K_1$) crossing points ($A_1$,$A_3$,$A_5$) with the odd number of radial beams ($f_1$,$f_3$,$f_5$) and because the number of circumferences ($K_2$) is half of the number of the crank arms ($n_1$), thus the common points of the circumferences ($K_1$) and ($K_2$) are half ($n_1/2$) of that number ($n_1$) too, and those points ($A_1$,$A_3$,$A_5$) connected consecutively form the basic chords ($A_1A_3$, $A_3A_5$, $A_5A_1$) of the basic circumference ($K_1$), whereat the distance between the common cross points ($B_1$,$B_2$,$B_3$) of the mutually crossing circumferences ($K_2$) which are at the same time points of the crossing in the middle of the basic chords ($A_1A_3$,$A_3A_5$,$A_5A_1$) with the even number of radial beams ($f_2$,$f_4$,$f_6$) on one part and on the other—the crossing points of the same even number of radial beams ($f_2$,$f_4$,$f_6$) with the basic circumference ($K_1$) at the points ($A_2$,$A_4$,$A_6$) define the value of the stroke (S) of the pistons and the chain-like connected basic chords ($A_1A_3$, $A_3A_5$,$A_5A_1$) form a close geometrical figure drawn in the basic circumference ($K_1$), whereat the tops of that figure ($A_1A_3$,$A_5$) divide the basic circumference ($K_1$) in arcs with equal length ($\overset{\frown}{A_1A_2A_3}$, $\overset{\frown}{A_3A_4A_5}$ and $\overset{\frown}{A_5A_6A_1}$) and each of those arcs has a length of two arcs ($L_1$) of the same circumference ($K_1$) or to each half length of the basic chords ($A_1A_3$,$A_3A_5$,$A_5A_1$) belongs one arc ($\overset{\frown}{L_1}$) of the division of the circumference ($K_1$) by the radial beams ($f_1$ . . . $f_6$), but the halves of the basic chords ($A_1A_3$,$A_3A_5$,$A_5A_1$) taken separately are chords of the circumferences ($K_2$) with their adjacent arcs ($\overset{\frown}{L_2}$); there is equation between the lengths of the arcs ($\overset{\frown}{L_1}$) and ($\overset{\frown}{L_2}$) of the circumferences ($K_1$) and ($K_2$) permiting reciprocating roll over without slipping over from one end position to another end position of the arcs ($L_2$) of the circumferences ($K_2$) on the arcs ($L_1$) of the circumference ($K_1$) whereat the ends of the arcs ($\overset{\frown}{L_2}$) of the circumferences ($K_2$) slip rectilinear, reciprocating on each of the axis lines ($f_1$ . . . $f_6$), on which those ends lie without leaving them or deviating from them, moving from the crossing points of the radial beams ($f_1$ . . . $f_6$) with the circumference ($K_1$) to the common crossing points ($B_1$,$B_2$,$B_3$) between the circumferences ($K_2$) which on its part represents the stroke of the pistons (S) and the consecutive chain-like connection of the ends of the arcs ($L_2$) of the circumferences ($K_2$) form a close geometrical figure with arc-like units (6), whereat the mutually connected ends of the units (6) are formed by means of axes as cylindrical hinges (7) of that hinged multi-unit, whereat the arcs ($L_2$) of the circumferences ($K_2$) (13) form the outer cylindrical surfaces of the arc-like units (6) and the basic circumference ($K_1$) (12) forms the inner cylindrical surface of the engine case (1) on which the arc-like units (6) of the hinged multi-unit roll over reciprocating whereat the piston rods (4) are connected flexibly in the axes of the cylindrical hinges (7) of the deforming hinged multi-unit and with their other ends the piston rods (4) are fixed with the pistons (3) whereat there are drawn circumferences ($K_3$) (8') from the centers ($O_2$) (9) of the circumferences ($K_2$) (13) with radii ($R_3$) smaller than the radii ($R_2$) of the circumferences ($K_2$) (13) and those circumferences ($K_3$) (8') define the inner cylindrical surfaces of the arc-like units (6) on which surfaces the engine rollers (8) roll over, mounted by means of their axes (9) on the gear wheels (10) of the engine shaft (11).

2. An internal combustion engine without a connecting rod according to the method of claim 1, which includes an engine case with lying in one plane with it radially situated working cylinders and pistons in them which are fixed on it, characterized in that the number of the crank arms ($n_1$) of the engine are equal or greater than six and it is even in number whereat the pistons (3) are fixed with the piston rods (4), and the piston rods (4) at their other end are connected flexibly by means of cylindrical hinges (7) in hinges with the arc-like units (6), as the even number of the arc-like units (6) define the number of working cylinders (2) with the pistons (3) in them and those arc-like units (6) form a closed hinged multi-unit, which touches flexibly with its outer cylindrical surfaces on the arc-like units (6) on the inner cylindrical surface of the engine case (1) and the engine shaft (11) is situated in the axis of the engine case (1) and it is formed by the shaft itself with two gear wheels (10) with rounded and pierced teeth, whereat the engine shaft (11) is put as a bearing in the lids of the engine case (1) and between the two gear wheels (10) in their pierced teeth are mounted axes (9) with the engine rollers (8) put on them in the form of a bearing; the axes (9) are parallel to and stand at equal distance of the axis line of the engine shaft (11) and the outer diameter of the rollers (8) is equal to the inner diameter of the arc-like units (6) and the number of the rollers (8), their axes (9) and the number of the teeth of each gear wheel (10) are the half of the number of the crank arms ($n_1$) of the engine.

3. An internal combustion engine without a connecting rod according to the method of claim 1, characterized in that a tooth power synchronizer is used, formed by the inner cylindrical surface of the engine case (1) with cut on it inner teeth (14) with a dividing line the basic circumference $K_1$ (12) and geared in them outer teeth (15) of the arc-like units (6) with dividing lines circumferences $K_2$ (13) whereat the axes of the cylindrical hinges (7) between the arc-like units (6) and the piston rods (4) lie on the divisor circumferences (13) of the arc-like units (6) of the hinged multi-units and the diameters of the dividing circumferences (13) of those units (6) are equal to the half of the diameter of the divisor circumference (12) the engine case (1), regardless of the even number of the crank arms ($n_1$) of the engine.

* * * * *